United States Patent [19]

Chauvet

[11] 4,220,403

[45] Sep. 2, 1980

[54] SYNCHRONIZING MEANS FOR MOTOR-DRIVE SYSTEMS

[76] Inventor: Francis Chauvet, 10 Rue Louis Forest, Louvciennes, Paris, France

[21] Appl. No.: 948,056

[22] Filed: Oct. 2, 1978

Related U.S. Application Data

[63] Continuation-in-part of Ser. No. 735,358, Oct. 26, 1976, abandoned.

[51] Int. Cl.² ............................................. G03B 31/00
[52] U.S. Cl. ....................................... 352/17; 352/23; 352/31
[58] Field of Search ........................ 352/12, 15, 16, 17, 352/23, 24, 31

[56] References Cited

U.S. PATENT DOCUMENTS

| | | | |
|---|---|---|---|
| 3,441,342 | 4/1969 | Ball et al. | 352/17 |
| 3,563,641 | 2/1971 | Ryder | 352/17 |
| 3,740,125 | 6/1973 | Harris | 352/17 |
| 3,743,392 | 7/1973 | Numata et al. | 352/17 |
| 3,979,774 | 9/1976 | Chen et al. | 352/15 |
| 3,999,842 | 12/1976 | Niederhauser et al. | 352/17 |

Primary Examiner—Monroe H. Hayes
Attorney, Agent, or Firm—Pollock, Vande Sande and Priddy

[57] ABSTRACT

Two or more motor driven systems are maintained in synchronism by a recorded wave of sine form on a tape driven by one of said systems, a signal derived from said sine wave being used to drive a stepper motor or stepper motors included in the other system or systems. The invention is particularly applicable to the synchronization of a film passing through a camera or projector with a sound track recorded on a magnetic tape, or of a number of films passing through a plurality of projectors or cameras. By converting the sine wave to pulses and maintaining a count of the pulses, (a) derived from the control signal and (b) supplied to the stepper motor, synchronism is maintained despite inertia effects during repeated starting, stopping and reversal of the drive.

7 Claims, 4 Drawing Figures

SYNCHRONIZING MEANS FOR MOTOR-DRIVE SYSTEMS

CROSS-REFERENCE TO RELATED APPLICATION

This application is a continuation-in-part of application Ser. No. 735,358, filed Oct. 26, 1976, now abandoned.

BRIEF DESCRIPTION OF THE INVENTION

This invention is concerned with the synchronization of two or more motor-drive systems and especially, though not essentially to the synchronization of a film passing through a camera or projector with a sound track recorded on a magnetic tape, or of a number of films passing through a plurality of projectors or cameras.

BACKGROUND OF THE INVENTION

The usual method of synchronizing the recordings on a sound track with a cinematographic film relies on both tape and film being perforated along their length with perforations of standard size and pitch agreed internationally. Synchronism is obtained by driving the film and the tape by toothed sprockets which are mechanically coupled together.

In an alternative system, the position of the magnetic tape (or that of the film) is read and the other is moved in step to follow the changes in position of the first. One example of this system uses a pair of synchros with three-phase line connections to maintain the relationship between the film and the tape.

DESCRIPTION OF THE INVENTION

In the synchronizing system of the present invention, a continuously alternating wave form is recorded on a tape, a signal of frequency dependent on the speed of the tape is obtained from this wave as the tape is driven, and this signal is used to drive one or more tapes in synchronism with the first tape. The recorded wave form is preferably a sine wave and will hereinafter be referred to as such though it will be understood that it may be of any suitable periodic wave form.

From one aspect, means for synchronizing two or more motor-drive systems according to the invention comprises a tape having recorded thereon a sine wave, means for obtaining a frequency from said sine wave as the tape is driven by one of said motor drive systems, and means for applying said frequency to drive a stepper motor which comprises the other motor drive system. The frequency obtained from the sine wave varies directly with the speed of the tape so that the output speed of the stepper motor will also be determined by the speed of the tape. If the stepper motor is then used to drive the sprocket of a film projector or camera, synchronism will be maintained between the tape and the film provided the pitch of the recorded sine wave and the number of pulses per revolution of the stepper motor are in a correct relationship.

In one application of the invention, the sine wave is recorded on a magnetic tape on which a sound record is made and the sine wave is used to synchronize the sound recorder with one or more projectors for a video film. Synchronization can similarly be obtained during recording of a sound record on the tape and a video film produced by a camera.

In an alternative form of the system, the sine wave may be derived aurally or magnetically from the repetition rate of a cine camera and applied to a stepper motor used to drive a magnetic tape on which sound would be recorded in synchronism with the picture.

The connection between the signal sensing element and the stepper motor drive system may be by cable, or by a radio link which would enable a static sound recording installation to be used in conjunction with a roving camera.

Another application of the invention is to the control of the speed of a number of projectors or cameras by a single tape having a recorded sine wave. This tape may be used solely to control the cameras or projectors or may be used in a sound recorder (or producer) to record (or produce) sound at the same time as the cameras or projectors record (or project) a visual record. Such an arrangement could be used in the filming or projection of 3-D films for example.

In any system in which one (slave) element is driven by another (control) and the system is required to start-up from rest, perhaps repeatedly, the start-up of the slave element can never be instantaneous owing to the inertia of the moving parts. If therefore a control signal corresponding to normal running speed is applied to the slave element, it will not be able to pick up full running speed at once but some acceleration time is needed and synchronism will be lost. This problem is overcome in the present invention by using a stepper motor to drive the slave element and feeding it with pulses derived from the controlling sine wave signal, the pulses so supplied being delivered to the motor at a rate which it can accept and follow during an accelerating phase. A storage facility, such as a binary digital counter, is provided which keeps account on the one hand of pulses supplied by the control signal and on the other of pulses applied to and responded to by the stepper motor of the slave element. When the rates of these two series of pulses match, the two elements are running synchronously. However, the rate at which the pulses can be accepted by the stepper motor driving the slave element is initially less than that corresponding to full running speed, and during the start-up a surplus of pulses will be stored. The arrangement is such that when the supply of control pulses ceases the pulses stored during start-up of the slave element are supplied to the stepper motor and synchronism is ensured. By using a relatively high frequency for the controlling and drive pulses it can be ensured that any discrepancy between the number of pulses supplied by the control signal and the number of steps taken by the stepper motor drive at any one time during running is insignificant. Synchronism will be restored in any case when the number of stored pulses has been reduced to zero.

The synchronizing system may be applied to a retrieval system for frames recorded on a film. The signal source is used to drive an electronic counter to show the film position at any time and to provide a method of indexing the film so that any particular frame may be preselected.

The invention may also be used to synchronize one film with several language tapes without using sprocketed magnetic tape.

BRIEF DESCRIPTION OF THE DRAWINGS

A preferred form of the invention will now be described by way of example only with reference to the accompanying drawings, in which

Referring to FIG. 1, the tape 1 has two tracks recorded thereon. Track 1 is a sound record and track 2 has a sine wave recorded thereon. The tape 1 is driven in a tape recorder 2 by a motor (not shown) and the output of track 1 is fed to a loudspeaker 3. The output of track 2 is fed to a stepper motor drive unit 4 which drives a stepper motor 5 driving a projector 6. This stepper motor 5 will thus be driven in synchronism with the motor of the recorder 2 so that the film passing through the projector 6 will be synchronized with the sound emitted from the loudspeaker 3.

The tape 1 can be produced by a similar circuit in reverse, the projector 6 being replaced by a camera and the loudspeaker 3 by a microphone or the like.

Figure 2:
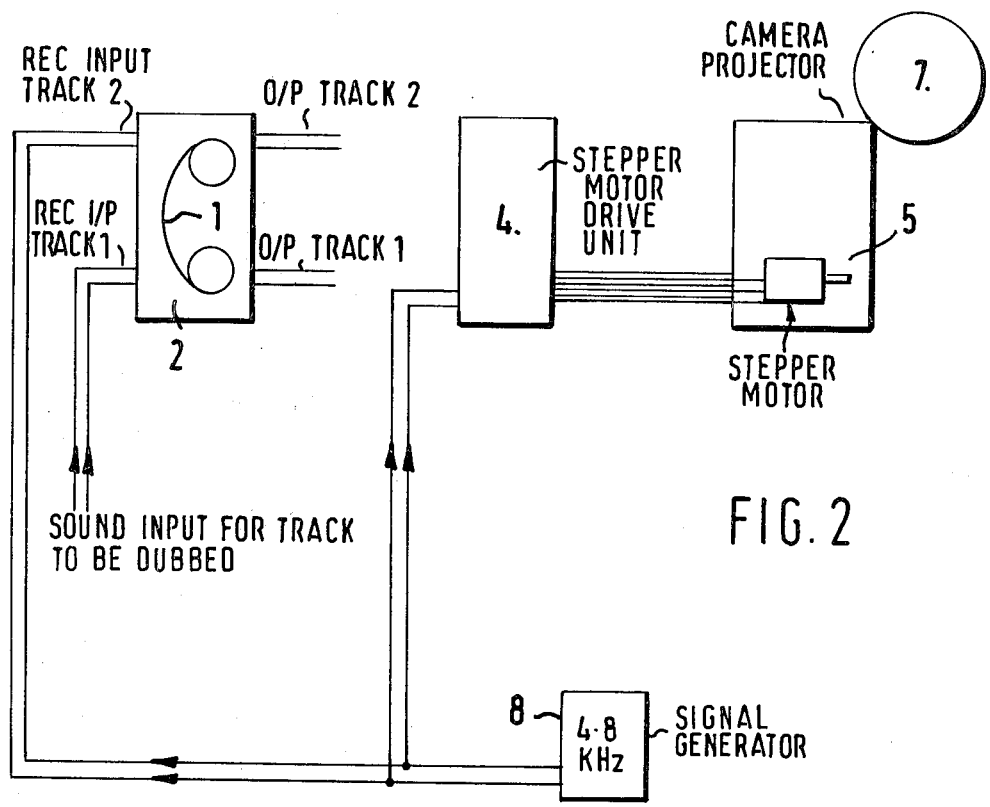
FIG. 2 is a diagram showing one method of recording the tracks on the tape
Figure 1:
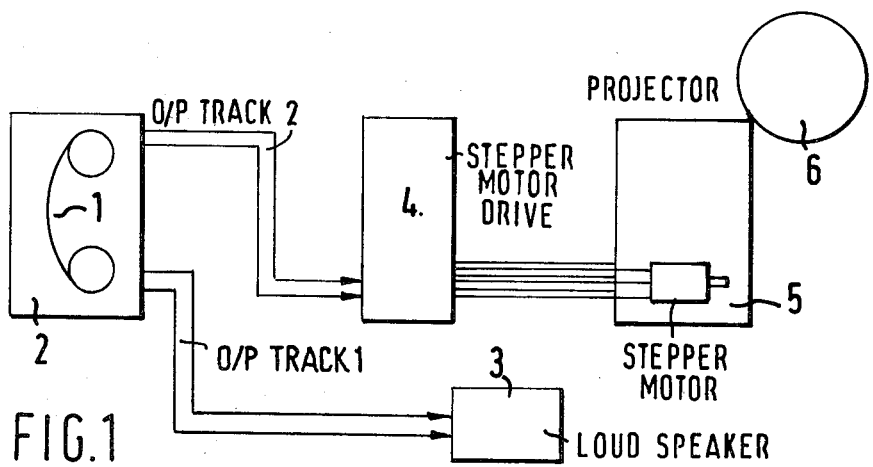
FIG. 1 is a diagram showing a projector and loud speaker driven in synchronism from a tape according to the invention.

FIG. 2 shows a circuit in which a sine wave signal is used to drive a stepper motor system to drive a camera and simultaneously the sine wave signal is recorded on a tape. As shown, the stepper motor 5 driving the camera 7 is fed with a signal from the signal generator 8 through the drive unit 4. The camera is used to drive the tape recorder 2 in which the tape 1 is mounted. At the same time, a constant frequency signal, for example of 4800 Hz or 5000 Hz from generator 8 is recorded on track 2 of the stereo pair. Replay of the tape with its synchronized sound on track 1, by driving a projector from the signal on track 2, ensures complete synchronization from camera to projector film.

A relatively high frequency, say in excess of 4000 Hz, and preferably around 4800 Hz or 5000 Hz is used for the control and drive signals for the following reasons.

It must be understood that if two equipments are to be run in synchronism and particularly if there are to be multiple starts and stops and even reversals of the tapes (or films), as for example there may be in sound film editing processes, it is necessary to ensure not only that the tapes are run at the same speed but that they are kept in step at all times. The natural inertia of any drive system limits the speed with which a tape or film can be started or stopped so that synchronism can be lost due to inertia effects whenever the system is started or stopped and such losses of synchronism can be accumulative. It follows that if the incremental steps by which the system is driven are large, the loss of one step will be significant; the smaller the steps by which the system is driven the less significant the loss of a single step will be. Thus, if the drive pulses are at a repetition rate of one per picture frame of a film, say, loss of one drive pulse will produce a discrepancy in synchronism of a whole frame. With 200 pulses per frame the error due to a single pulse "lost" will be only 1/200th of a frame.

Similarly, the effect of loss of synchronism due to inertia is dependent upon load. With a low pulse rate the pulse power requirement is much higher than with a high pulse rate or in other words the system is much more sensitive to load. To produce the running torque for high speed running therefore a high pulse rate operating in small steps is necessary. This effect is of course even more significant in starting and stopping regimes.

According to this invention not only is a high pulse rate used but a system of control is employed in which the starting and stopping of the tapes or films is matched in speed and the synchronism of the system is maintained at all times.

Figure 3:
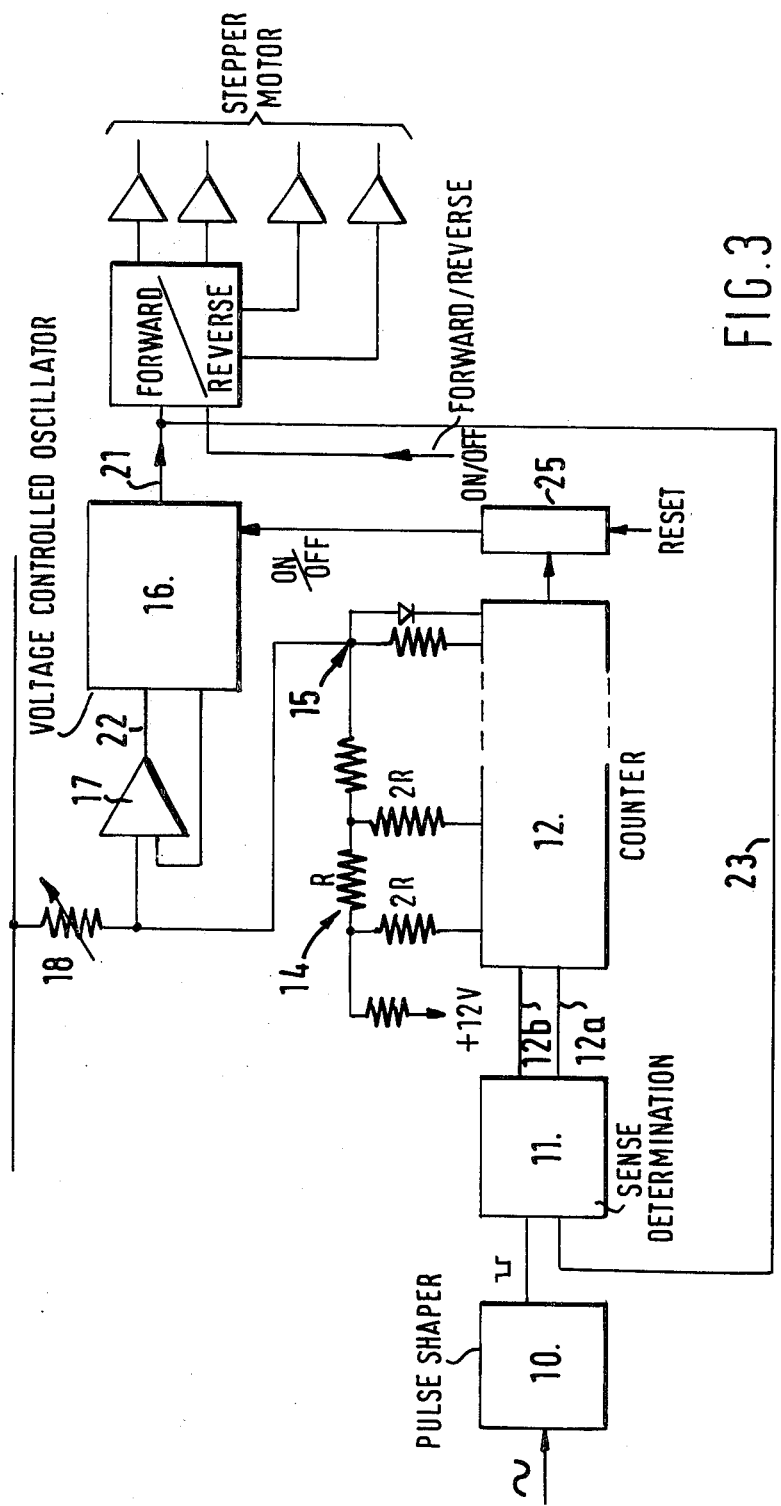
FIG. 3 is a block schematic diagram of the drive unit 4 of FIGS. 1 and 2.

The arrangement for achieving this will now be described with reference to FIGS. 3 and 4. The high frequency sine wave signal, preferably in excess of 4000 Hz, be it from a tape recording used to control the system or from a high frequency power source driving a recording system, is converted in shaping circuit 10 to a pulse train of the same frequency. This pulse train is applied through a sense determining circuit 11 to a binary digital counting circuit 12. The sense determining circuit 11 determines whether the pulses applied to the counter 12 over lead 12a operate the counter in an upward sense, i.e., each pulse increases the stored count by "1" or, in a downward sense, i.e., each pulse decreases the stored count by "1." The "sense" signal is applied over lead 12b. The digital counter 12 can be of any conventional binary form providing a count capacity of say 16 binary bits. It operates to control a potentiometer chain 14 to provide at 15 a voltage proportional to the level of the count set up at any given time in the counter 12.

A voltage controlled oscillator 16 of known kind is controlled by the voltage from 15 applied through amplifier 17. The voltage range derived at 15 is adjustable by the variable resistor 18 to provide a threshold for operation of the oscillator.

Figure 4:
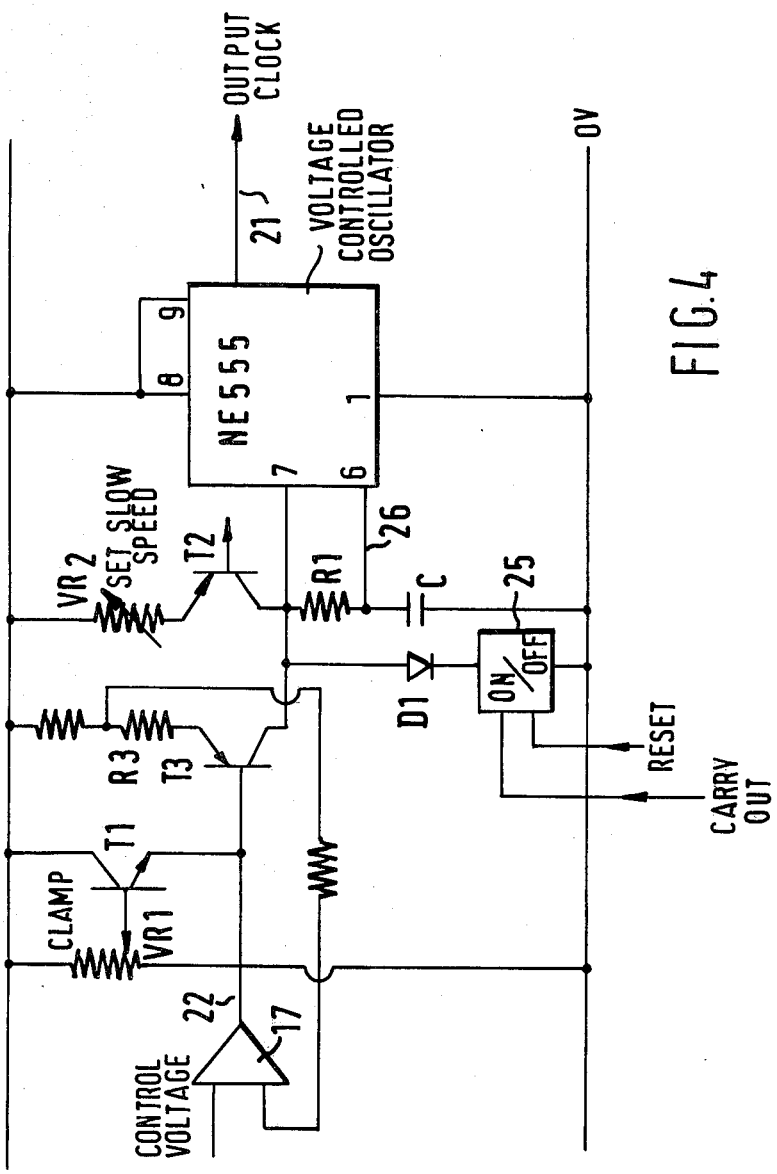
FIG. 4 is a circuit diagram of the oscillator of FIG. 3.

Details of the voltage controlled oscillator 16 are given in FIG. 4. A standard integrated circuit "chip" of the kind known as NE555 is the basic voltage controlled oscillator which provides output pulses on the output lead 21 at a frequency rate proportional to the voltage applied at input lead 26. This voltage is the voltage on capacity C which is fed through R1 either through transistor T2, or transistor T3. Transistor T2 provides a minimum charging rate and hence a minimum voltage on lead 26 and low speed clock pulse rate on the output lead 21. This can be set by means of the variable resistor $VR_2$. The voltage from amplifier 17 is applied over lead 22 to transistor T3 to set the charging rate for C in accordance with the control voltage at 15 and so match the outut pulse rate over output lead 21 to the count in the counter 12. A further transistor T1 connected to potentiometer $VR_1$ sets the maximum charging rate for C and hence the maximum pulse rate from the oscillator. A feedback signal to amplifier 17 is taken from the potentiometer R3 in the emitter circuit to T3 to stabilize the feed to capacitor C. The oscillator is switched on and off by grounding the input through D1. This is effected by means of a two-state circuit 25 which is controlled by the most significant digit of the binary counter to switch the oscillator on when that digit changes to "0."

The operation of the system is as follows. On switching on, the counter 12 is set to the state in which all digits are at "1." When the controlling sine wave signal starts and the first pulse is supplied by pulse shaper circuit 10, the unit 11 determines that the counter will count down. Thus the most significant digit is changed immediately to "0" and the oscillator 16 is switched on. The voltage at 15 is also simultaneously increased and pulses start to be generated by the oscillator 16 and are fed to the stepper motor driving the "slave" equipment whatever that may be, say a tape or a film. Feedback pulses are also supplied over lead 23 to unit 11 to drive the counter in the "up" sense.

As the downward count due to control pulses from 10 is initially faster than the upward count due to feedback pulses from 16 the count registered on the counter 12 decreases progressively, thus continuing to increase the voltage at 15 and so increasing the frequency generated by the oscillator 16 until such time as the rate of the feedback pulses generated matches the frequency of the control signal and the system reaches a steady state where the speed of the driven element (tape or film) matches the speed of the control element. Synchronism is thus maintained except that there is a small lag equivalent to the pulses stored in the counter during the start-up phase above described. The voltage/frequency characteristic of the voltage controlled oscillator 16 is arranged to match the operating characteristics of the stepper motor to which the drive pulses from 16 are applied so that the build-up of pulse rate from 16 as the count in counter 12 goes down is within the capacity of the stepper motor to follow during this accelerating phase.

When the control pulses cease due, say, to stopping of the master tape the oscillator continues to supply feedback pulses and move the counter upwards simultaneously reducing the control voltage on the oscillator and thus its frequency until the counter is restored to the "all ones" state, the most significant digit changes to "1" and the oscillator 16 is switched off. When this point is reached the number of pulses applied to the stepper motor driving the slave element equals the number of pulses generated by the control signal so that precise synchronism is established and the small lag set in during start-up has been eliminated. In view of the relatively high frequency employed this small lag is insignificant since it represents only a small fraction of a frame of a film.

It will be seen that the system of the present invention has the important feature that the signal from the recorded sine wave controls the starting and stopping of the associated motor-drive systems and their speed. Other advantages are that the speed and position of film or tape driven by a motor drive system are controlled solely by the signal from the sine wave which is dependant directly on the speed of the tape on which it is recorded. No sprocketed sound tape is needed and the system can operate on any convenient power system.

I claim:

1. An apparatus for synchronizing two or more motor driven systems comprising a tape having recorded thereon a sine wave signal, means for driving said tape from one of said systems, means for obtaining a sine wave signal from the recording on said tape as said tape is driven, a stepper motor included in another said motor driven system, means for converting said sine wave signal to provide a pulse source for said stepper motor and for applying pulses therefrom to drive said stepper motor, said last named means including storage means arranged to accept input pulse signals derived from said sine wave signal and deliver an output of pulses at a rate acceptable to said stepper motor during starting, running and stopping of said motor driven systems, and said storage means being further operative to relate the number of pulses supplied to drive said stepper motor to the number of pulses derived from said sine wave signal whereby to maintain synchronism between said systems.

2. An apparatus for synchronizing two or more motor driven systems comprising a tape having recorded thereon a speed control signal, means for driving said tape from one of said systems and deriving from the recording thereon a control signal in the form of a pulse train, a stepper motor included in another said motor driven system, a drive pulse source, means for supplying drive pulses from said drive pulse source to drive said stepper motor, pulse counting means, means for applying pulses from said control signal and from said drive pulse source in opposite senses to said pulse counting means, and means for controlling the rate of supply of said drive pulses to said stepper motor in accordance with the state of said counting means to maintain said rate within the operating capability of said stepper motor during starting, running and stopping of said motor driven systems and to relate the number of pulses supplied to said stepper motor to the number of pulses derived from said control signal whereby to maintain said stepper motor in proper correlation to said control signal.

3. An apparatus as claimed in claim 2, wherein the control signal pulse train is derived from a recorded sine wave of frequency in excess of 4000 Hz.

4. An apparatus as claimed in claim 2, including a voltage controlled oscillator arranged to supply drive pulses to said stepper motor and to said pulse counting means, said pulse counting means being arranged to deliver to said voltage controlled oscillator a control voltage related to the pulse count stored therein whereby to control the frequency of said oscillator to maintain correspondence between said motor driven systems.

5. The method of synchronizing two or more motor driven systems one of which includes a record tape, comprising recording a sine wave signal on said record tape, driving said tape and obtaining from said recorded sine wave signal a control pulse signal of frequency dependent on the speed of said record tape, applying the pulses so obtained to pulse counting means to operate said pulse counting means in an upward sense, generating drive pulses at a frequency related to the count of said pulses existing at any given time, applying said drive pulses to drive a stepper motor driving a second one of said motor driven systems, and applying said drive pulses also to said pulse counting means to operate said pulse counting means in a downward sense whereby to achieve a balance between the supply of control pulses and the supply of drive pulses and maintain said motor driven systems in synchronism.

6. The method of driving a sound record tape synchronously with a picture film which comprises the steps of generating a primary sine wave signal, connecting said primary sine wave signal to provide an input drive for a stepper motor, applying said stepper motor to drive a camera to produce said picture film and simultaneously to drive a recording tape, applying said primary sine wave signal as a recording input to a control track on said recording tape, simultaneously applying sound signals to a sound track on said recording tape, playing back said recording tape and deriving therefrom sound signals from said sound track and a secondary sine wave signal from said control track, converting said secondary sine wave signal into pulses to provide a control signal pulse train, applying said pulse train to a binary digital counter chain to reduce the count therein, deriving from said counter chain a voltage proportional to the count therein, applying said voltage as control voltage to a voltage controlled oscillator, deriving from said voltage controlled oscillator a drive pulse train of frequency related to said control voltage, applying said drive pulse train as drive to a stepper motor driving a projector to project said picture film in synchronism with said sound signals, and applying pulses from said voltage controlled oscillator as feedback to said counting circuit to augment the count therein whereby to establish a balance between the pulses from said control signal pulse train and the pulse train from said voltage controlled oscillator and maintain synchronism between said record tape and said picture film.

7. Method as claimed in claim 6, in which said primary sine wave signal is of a frequency in excess of 4000 Hz.

* * * * *